US010050978B2

(12) United States Patent
Morton et al.

(10) Patent No.: US 10,050,978 B2
(45) Date of Patent: Aug. 14, 2018

(54) SYSTEMS AND METHODS FOR SECURING COMMAND AND DATA INTERFACES TO SENSORS AND DEVICES THROUGH THE USE OF A PROTECTED SECURITY ZONE

(71) Applicant: DELL PRODUCTS L.P., Round Rock, TX (US)

(72) Inventors: Michael John Morton, Morrisville, NC (US); Aaron Kenneth Blackwell, Redding, CT (US); Richard A. Backhouse, Apex, NC (US)

(73) Assignee: DELL PRODUCTS LP, Round Rock, TX (US)

( * ) Notice: Subject to any disclaimer, the term of this patent is extended or adjusted under 35 U.S.C. 154(b) by 167 days.

(21) Appl. No.: 14/885,212

(22) Filed: Oct. 16, 2015

(65) Prior Publication Data

US 2017/0111373 A1    Apr. 20, 2017

(51) Int. Cl.
*G06F 17/00* (2006.01)
*H04L 29/06* (2006.01)
*H04L 29/08* (2006.01)
*G08B 25/01* (2006.01)
*H04W 8/00* (2009.01)
*H04L 12/24* (2006.01)

(52) U.S. Cl.
CPC ........ *H04L 63/126* (2013.01); *H04L 63/0209* (2013.01); *H04L 63/0281* (2013.01); *H04L 63/20* (2013.01); *G06F 17/00* (2013.01); *G08B 25/016* (2013.01); *G08B 25/018* (2013.01); *H04L 29/06* (2013.01); *H04L 41/0893* (2013.01); *H04L 67/10* (2013.01); *H04L 67/12* (2013.01); *H04L 67/306* (2013.01); *H04W 8/005* (2013.01)

(58) Field of Classification Search
CPC ....... H04L 63/20; H04L 63/126; H04L 67/10; H04L 67/12; H04L 67/306; H04L 41/0893; H04L 29/06; G08B 25/016; G08B 25/018; H04W 4/005; G06F 17/00
See application file for complete search history.

(56) References Cited

U.S. PATENT DOCUMENTS

| | | | | |
|---|---|---|---|---|
| 2014/0245374 A1* | 8/2014 | Deerman | ........ | H04L 63/20 726/1 |
| 2015/0019714 A1* | 1/2015 | Shaashua | ........ | H04L 67/24 709/224 |
| 2015/0134801 A1* | 5/2015 | Walley | ........ | H04L 41/0893 709/223 |
| 2015/0350902 A1* | 12/2015 | Baxley | ........ | H04W 4/90 726/7 |

(Continued)

*Primary Examiner* — Jayesh M Jhaveri
(74) *Attorney, Agent, or Firm* — North Weber & Baugh LLP

(57) ABSTRACT

Various embodiments of the invention increase security of a network of interoperable devices. In certain embodiments, this is accomplished by a security module that uses a user-definable security policy that sets forth one or more tests for validating input data or commands received from an IoT device. A validator receives the command via a command controller and performs a security analysis of the command according to the security policy. Responsive to the security analysis, the validator generates a validation signal in order to authorize or reject further processing of the command.

21 Claims, 5 Drawing Sheets

(56) References Cited

U.S. PATENT DOCUMENTS

2016/0093198 A1\* 3/2016 Tung .................... G08B 25/016
                                                    340/539.11
2017/0093915 A1\* 3/2017 Ellis ........................ H04L 63/20
2018/0007058 A1\* 1/2018 Zou ..................... H04L 63/1408

\* cited by examiner

SYSTEMS AND METHODS FOR SECURING COMMAND AND DATA INTERFACES TO SENSORS AND DEVICES THROUGH THE USE OF A PROTECTED SECURITY ZONE

TECHNICAL FIELD

The present disclosure relates to information handling systems, such as networked devices. More particularly, the present disclosure related to systems and methods for improving security of interfacing with one or more information handling systems using a network.

DESCRIPTION OF THE RELATED ART

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An Internet of Things (IoT) information handling system is designed to provide interoperability between objects and persons taking advantage of a network, such as the Internet. Objects can be physical devices, such as sensors, actuators, or other information handling system, or virtual representations thereof, e.g., virtual devices. Communication between objects is typically established and managed, for example, using IP addresses. In particular, objects may managed via a management system that creates, modifies, and supervises device configurations and interoperability.

One of the most significant challenges that IoT deployments face is the need to provide security to a vast number and type of different devices in a multi-vendor heterogeneous environment. A plethora of legacy and evolving vendor and industry standards exists around transport, transport protocols, and data models in a new world of interconnected sensors and devices. Oftentimes, device driver standards for ZigBee, Z-Wave, and 6LoWPAN are used alongside various device specific drivers that adhere to no standards.

The lack of unity is exacerbated by an increasing complexity and a security uncertainty that results from a multitude of security models introduced by a flood of new sensors and devices entering the market that continues to expand the number and diversity of proprietary security models. As a result, security levels of sensors and devices range from excellent to practically not existent. This exposes networks to a high risk of attacks by potential intruders that seek to exploit the vulnerabilities associated with less protected products, in particular, to gain access, for example, to an entire data center that controls numerous devices, sensors, and gateways. A successful attack on the weakest link in a network may afford the determined attacker a relatively easy means of manipulating one or more devices, e.g., by influencing the behavior of a critical device, including otherwise secure network devices that depend on data or actions of an inadequately secured class of devices, for the purpose of executing malicious actions that may result in significant economic damage.

Accordingly, what is needed are systems and methods that may act as a hub for unifying and centrally managing the diverse environment of deployed devices while, at the same time, increasing network security.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Elements in the figures may not be drawn to scale.

FIGURE ("FIG.") 1 illustrates a system for improving security in a network comprising interoperable devices by using a security zone service according to various embodiments of the present disclosure.

DETAILED DESCRIPTION OF THE PREFERRED EMBODIMENTS

Figure 1:
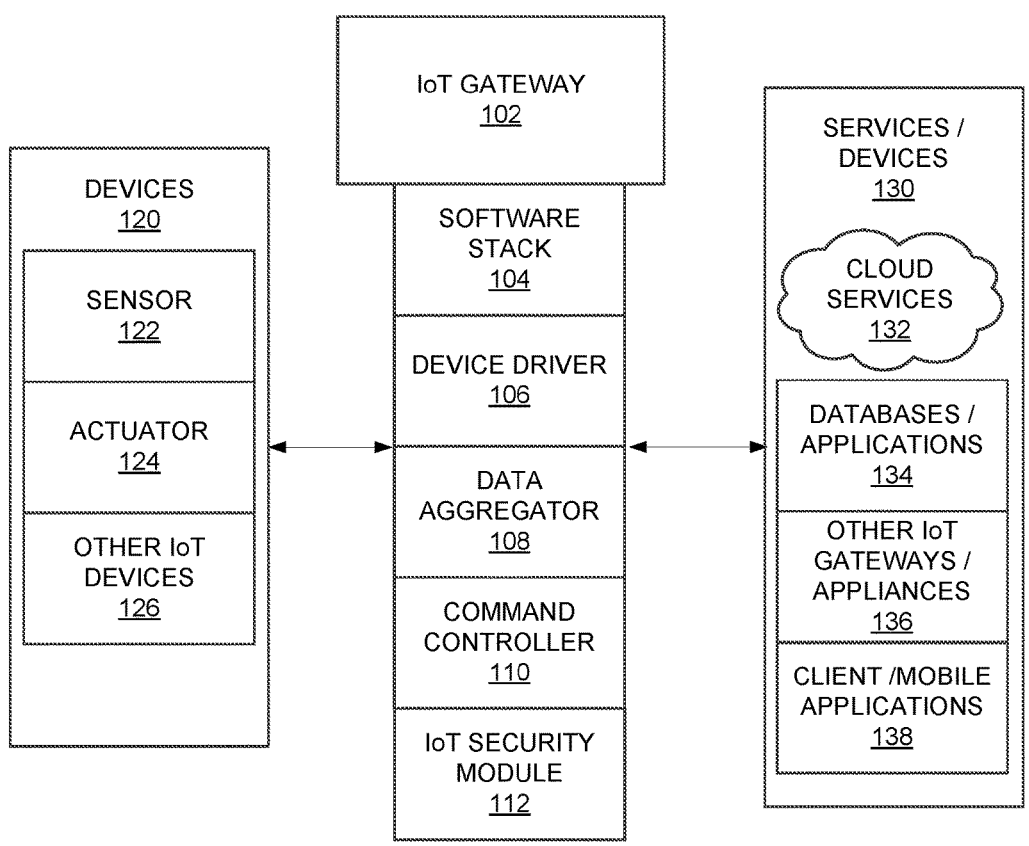

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

It shall be noted that: (1) certain steps may optionally be performed; (2) steps may not be limited to the specific order set forth herein; (3) certain steps may be performed in different orders; and (4) certain steps may be done concurrently. Furthermore, it shall be noted that embodiments described herein are given in the context of IoT, but one skilled in the art shall recognize that the teachings of the present disclosure are not limited to IoT applications and may equally be used in other contexts.

FIG. 1 illustrates a system for improving security in a network comprising interoperable devices by using a security zone service according to various embodiments of the present disclosure. System 100 comprises a network of interoperable things, such as IoT devices 120, IoT gateway 102, and services 130. As shown in example in FIG. 1, IoT devices 120 may comprise electronic devices, such as sensor 122 and actuator 124, and other things and devices 126.

Sensor 122 and actuator 124 are commonly known devices that may or may not be portable, secured, etc. One example of a typical sensor 122 is a temperature sensor that converts a measured physical quantity (room temperature) into an electrical signal and communicates the signal via a wired or wireless connection to a network device. In embodiments, sensor 122 and actuator 124 are virtual representations of actual physical devices.

In embodiments, services and/or devices 130 may comprise databases and applications 134, other IoT gateways/appliances 136 and client/mobile applications 130 and may be implemented in software and/or firmware. In embodiments, IoT gateway 102 comprises software stack 104, device driver 106, data aggregator 108, command controller 110, and IoT security module 112. IoT gateway 102 executes software stack 104 that includes technology-specific device drivers 106. Device drivers 106 facilitate communication and interface invocations that are specific to a particular vendor or industry standard.

Devices communicate with one another using any communication method known in the art, e.g., wireless communication using a communication protocol. In embodiments, IoT gateway 102 exchanges data (e.g., IoT device information) and commands (e.g., Enable) with IoT devices 120 and services/devices 130 via an IP address by using any communication protocol known in the art. For example, data aggregator 108 may receive via an interface of command controller 110 data from sensor 122 and, based on the sensor data, a command from database applications 134 that is destined for actuator 124.

In embodiments, gateway 102 preprocesses (e.g., filters and categorizes) the data from device 120 prior to transmitting it to service 130, e.g., to exclude data from a malfunctioning sensor. In response to database application 134 receiving IoT information related to sensor 122, command controller 110 receives a command from IoT device 130 and directs the input to IoT security module 112 for purposes of evaluation and validation. In embodiments, an input, such as data, commands, or requests for commands, that arrives at IoT gateway 102 over a network and that is directed to IoT device 120 passes through security module 112, which decides on validity by performing one or more tests for validating the input (e.g., whether a command for altering temperature is valid or more likely received from a failing sensor, via an attack, etc.) whether to forward the command to IoT device 120, and whether and how system 100 should react.

In embodiments, security module 112 comprises a validation module receives the input from the command controller and performs a security analysis of the input according to the security policy, and, responsive to the security analysis, outputs a validation signal to authorize or reject further processing of the input.

Upon successful validation, the security module 112 may send a confirmation to command controller 110 to indicate validity of the command. Command controller 110 then forwards the validated command or a representation thereof to actuator 124 to initiate a desired action. It is understood that memory devices and processors (not shown) may be embedded in any of the modules shown in system 100. Alternatively, one or more units may be used as standalone unit. In embodiments, processor operates a security zone service within IoT security module 112 to perform the security analysis. A memory device coupled to the processor stores and makes available a security policy that is based on default rules, user-definable rules, or a combination thereof.

In embodiments, IoT security module 112 is designed to enable and disable IoT devices 120 and configure their settings, e.g., based on a security policy for a particular class of devices; communication settings of one or more nearby devices; a specific a task to be performed, and the like.

In embodiments, to determine validity of a command received from IoT device 130, the security zone service accesses and uses data (collectively called "knowledge database") from devices internal or external to gateway 102 when evaluating or analyzing a command based on security criteria, for example, by comparing data received from sensor 122 to historical data or data from other sensors that potentially have unknown security levels.

Various types of data, including device data, may be harvested to discover anomalies and evaluate the reliability/validity of existing and new data. This may be used, for example, to evaluate whether a potentially damaged peer device provides inaccurate readings, and whether a command to alter a temperature is likely invalid based on contextual data, so as to facilitate appropriate action (including inaction, e.g., to prevent a false alarm).

In embodiments, the knowledge database is a distributed database that holds data gathered from devices external to gateway 102 (e.g., IoT devices 120 and services 130) or internally generated data (e.g., by security module 112 itself) and any data that may be derived therefrom. Such data includes, for example, previously received and executed commands; metadata related to IoT device 120 (e.g., data indicating that sensor 122 was tampered with, a battery level that indicates untrustworthiness, or a reading that is outside of the detectable temperature range of a sensor, thus, indicating a sensor failure); crowd-sourced data (e.g., gathered from sensors of a certain class across a large section of a population or peer devices in a certain geographical region); and information from independent sources, (e.g., database 134). It is understood that data in the knowledge database may be added, deleted, or replaced with new data, automatically or based on user feedback. In embodiments, gathered/generated data is used to find a data pattern that is characteristic of a valid (or invalid) command for a given type of sensor and set of contextual parameters (e.g. frequency or timing of the command). Crowd-sourced data may be used to establish a measurable standard (e.g., average water use in a neighborhood) that can be incorporated into the security policy and/or expand the knowledge database, for example, to determine the validity of a command indicating an anomaly, such as a potential water break in a dwelling.

In embodiments, data from the knowledge database is used to execute rules or generate new rules, e.g., using heuristics. For example, from a regularly occurring event is it concluded that that event should regularly occur at the same time or location.

In embodiments, as part of analyzing the command, e.g., prior to performing some action by actuator 124, security module 112 determines a risk factor or reliability factor associated with the received command. The risk factor is based on at least one security criterion that is used to determine validity of the command. The security criterion may indicate, for example, a potential tamper attempt based on an unauthorized or unexpected change in the location of sensor 122. If the risk factor exceeds an acceptable level, security module 112 rejects the command as invalid and does not forward the command or an indication of its validity to actuator 124. Data related to the rejection may be logged in the knowledge database and used in the analysis of subsequent commands received from the same IoT device 120, group of IoT devices 120, or received from a particular interface.

It is understood that two or more of the disclosed methods can be used concurrently to analyze data, execute a rule, or generate a rule. Methods may also be combined with one or more independent sources of verification. For example, crowd-sourced data may undergo machine-to-machine verification (e.g., user ID, secure connection). Similarly, user-to-machine verification may require user credentials (e.g., passwords). It is further understood that, any other method of analysis (e.g., Fuzzy Logic) may be employed to verify a command or data.

In embodiments, security module 112 determines a risk factor based on an analysis that involves correlating data related to one or more IoT devices 120 (and/or persons) and determining a variation in a predetermined condition. The condition may be a user-defined parameter that is based on user experience, a device condition (e.g., calibration), or any relevant data derived from gathered and analyzed information. For example, in order to determine a room temperature, data from multiple sensors 122 may be combined with information about the outdoor temperature; number of open windows; heat generating devices; persons in the room; and distance to each sensor.

Analysis may further involve determining a relationship between IoT devices 120 (and/or persons), such as location information derived from peer-to-peer data that is exchanged between devices to aid in the discovery of an anomaly. For example, a decision whether to take action and the degree thereof (e.g., issue a warning/precaution vs. initiating an action) may be made dependent on a communicated distance between two IoT devices or a device that is associated with a particular person having authority. As another example, security module 112 may poll IoT device 120 data to correlate data from several temperature sensors and smoke detectors distributed throughout an area of a building to determine a risk factor and, ultimately, verify a fire and act accordingly (turn on sprinklers and/or call fire department).

In embodiments, data is acquired and analyzed via a machine learning process that learns what is "normal" and aids in the decision making process by building on a set of learned patterns (intelligent building).

In embodiments, security criteria and the knowledge database itself are dynamically updated in fixed or variable intervals of time (e.g., based on reported or analyzed data).

Figure 2:
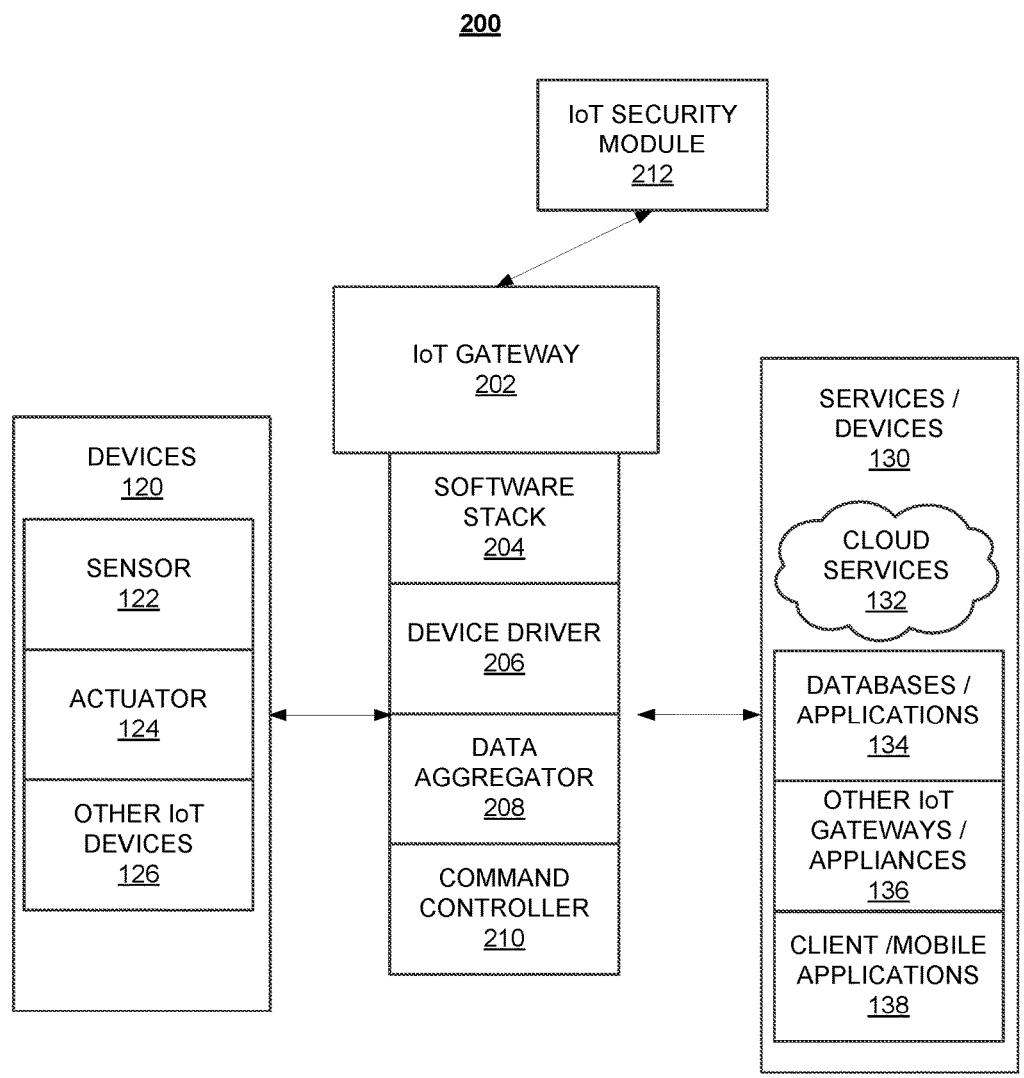
FIG. 2 illustrates a system for improving security in a network comprising interoperable devices by using a security zone service that is provided externally to a gateway according to various embodiments of the present disclosure.

FIG. 2 illustrates a system for improving security in a network comprising interoperable devices by using a security zone service that is provided externally to a gateway according to various embodiments of the present disclosure. For clarity, components similar to those shown in FIG. 1 are labeled in a similar manner. For purposes of brevity, a description of their function is not repeated here. IoT gateway 202 in system 200 comprises software stack 204, device driver 206, data aggregator 208, and command controller 210. As shown in FIG. 2, IoT security module 212 is not implemented in IoT gateway 202. Rather the security zone services provided by IoT security module 212 are externally hosted.

In operation, IoT gateway 202 exchanges data and commands with IoT security module 212. In embodiments, command controller 210 receives a command from IoT device 130 and directs it to IoT security module 212 for evaluation and validation. Security module 212 determines the validity of the command and, if valid, instructs command controller 110 to forward the command to IoT device 120. By routing commands through security module 212, security module 212 acts as a proxy that serves to filter commands and evaluate them for validity prior to permitting commands to be executed by IoT device 120.

One of skill in the art will appreciate that IoT security module 212 may be a distributed system that can be accessed via multiple physical or logical channels.

Figure 3:
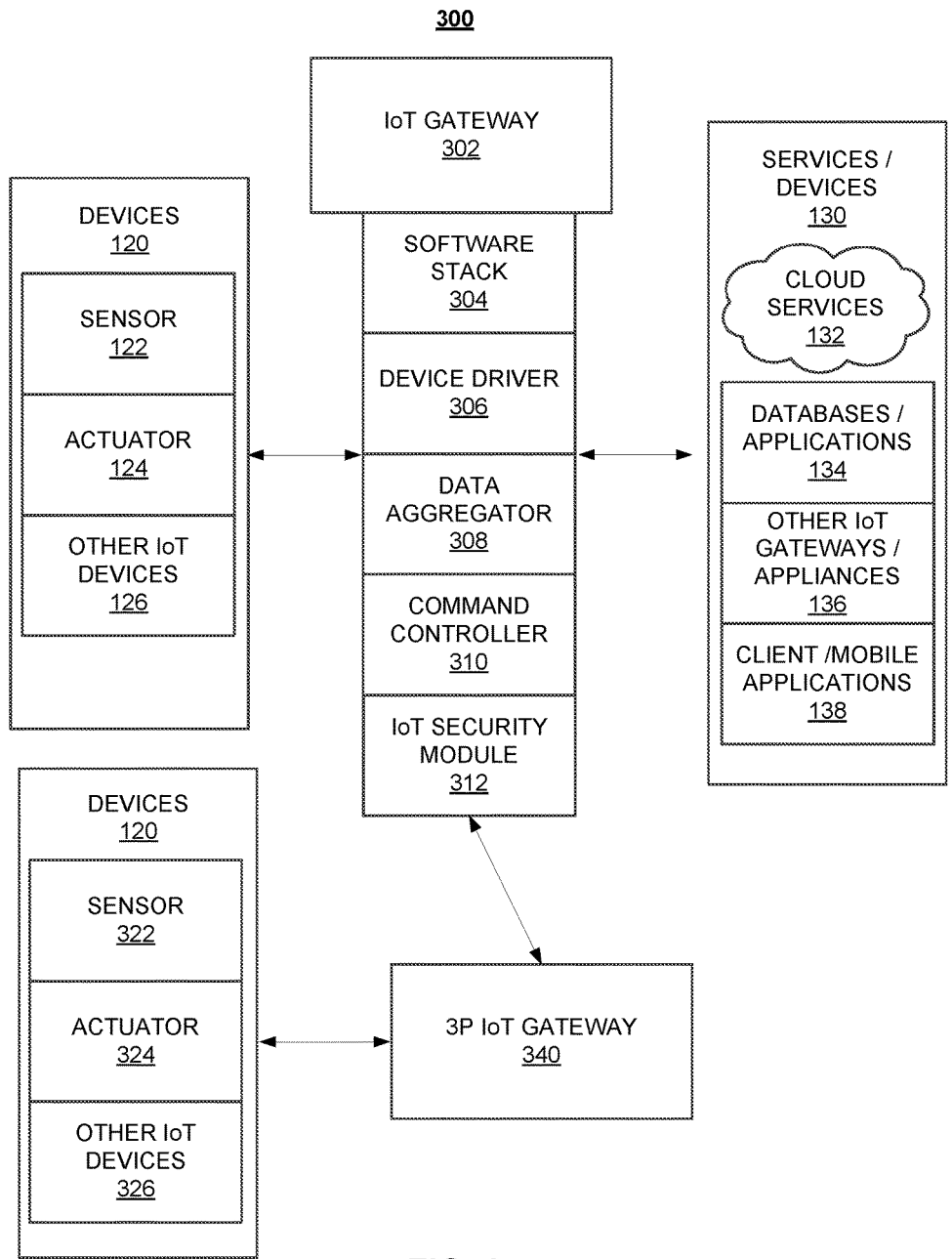
FIG. 3 illustrates a system for improving security in a network comprising a third party gateway, according to various environment of the present disclosure.

FIG. 3 illustrates a system for improving security in a network comprising a third party gateway, according to various environment of the present disclosure. Again, same numerals as in FIG. 1 denote similar elements and a description of their function is omitted for purposes of brevity.

System 300 comprises IoT devices 120 and 320, IoT gateway 302 and 340, and services and/or devices 130. In a manner similar to IoT devices 120, IoT services/devices 130 may comprise electronic devices, such as sensors 322, actuators 324, and other things/devices 326. IoT gateway 340 may be a common third party gateway.

In operation, IoT gateway 302 in communication with IoT gateway 340 to exchange data and commands. In embodiments, IoT gateway 340 has its own an IP address over which it communicates with IoT gateway 302 and IoT devices 320. IoT gateway 340 may be a common external gateway that need not be concerned with the validity of data or commands, but rather receives data (e.g., IoT information) from IoT devices 320 and delivers commands to IoT devices 320.

Similar to FIG. 1, IoT gateway 202 may preprocess data sent by IoT devices 120 and 320; use controller 310 to transmit the data to IoT devices 130 over a network; and use security module 312 to validate commands received by services 130 prior to passing the validated command information to IoT device 120 and, via IoT gateway 340, to IoT device 320.

Data or commands from IoT devices 130, 320 arrive at IoT gateway 340 first and are redirected to a security service provided by IoT security module 312. IoT gateway 340 waits for a validated command (e.g., true or false) prior to forwarding a command to one or more of IoT devices 320.

Figure 4:
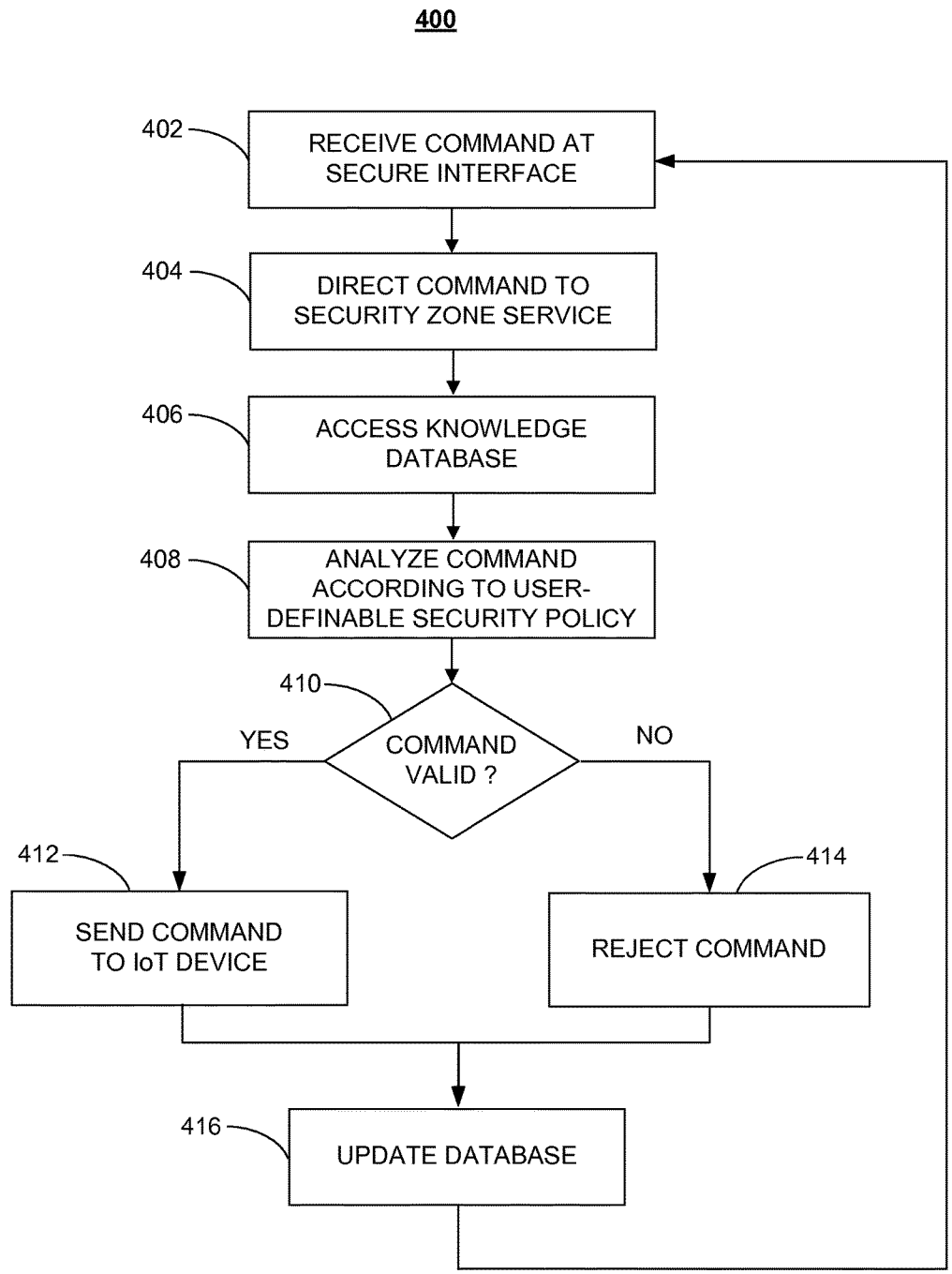
FIG. 4 is a flowchart of an illustrative process for improving security in a network in accordance with various embodiments of the present disclosure.

FIG. 4 is a flowchart of an illustrative process for improving security in a network in accordance with various embodiments of the present disclosure. The process to provide security to the network starts at step 402, when a command destined for an IoT device, such as a sensor, is received at an interface connected to the IoT device. The sensor has a potentially unknown security level.

At step 404, the command is directed to a security zone service that may be provided by a secured gateway device.

At step 406, a knowledge database is accessed by the security zone service to obtain data, such as a data pattern that is characteristic of the command; metadata related to the IoT device; crowd-sourced data; and information from one or more independent sources.

Crowd-sourced data may be derived from the one or more IoT devices and may be used to establish a measurable standard.

At step 408, and the retrieved data is used to analyze the command according to one or more user-definable security criteria in order to validate the command. Analysis may involve calculating a risk factor that is associated with the command and based on at least one user-definable security criterion. The risk factor may indicate, for example, a tamper attempt.

Analysis may further involve correlating data related to one or more IoT devices in order to detect a variation in a condition, such as a user-defined parameter. The condition may also be a device condition or any other data derived from information acquired via machine learning. Analysis may further involve determining a relationship between IoT devices, such as spatial information, e.g., based on peer-to-peer data exchange between two or more devices.

At step 410, it is determined whether the command is valid.

If so, then, at step 412 the command or confirmation of its validity is forwarded to the IoT device to enable some action based on the calculated risk factor.

If the command is invalid, then, at step 414, the command is rejected, e.g., in response to a failure to receive confirmation information. The rejection may be carried on to subsequent commands received from that IoT device at a particular interface.

At step 416, the knowledge database may be updated accordingly.

Aspects of the present patent document are directed to information handling systems. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 5:
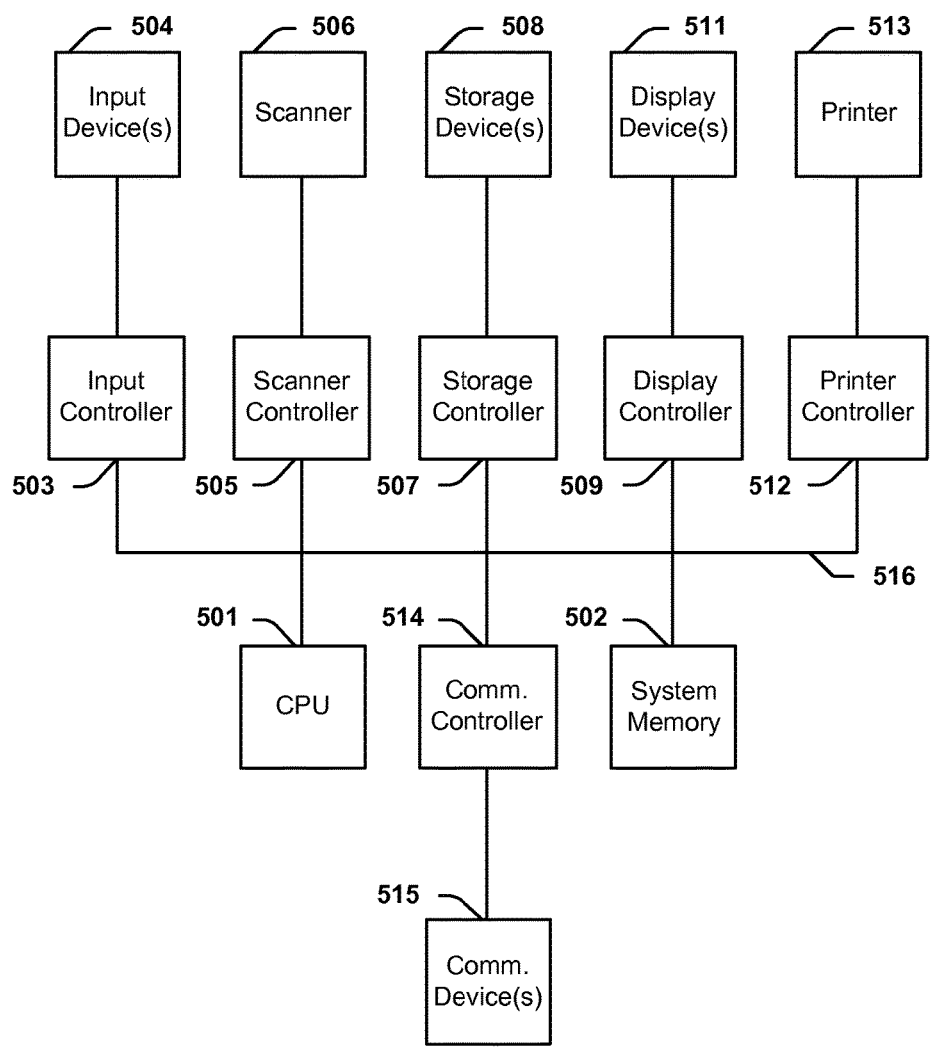
FIG. 5 depicts a block diagram of an information handling system according to embodiments of the present disclosure.

FIG. 5 depicts a block diagram of an information handling system according to embodiments of the present disclosure. It will be understood that the functionalities shown for system 500 may operate to support various embodiments of an information handling system—although it shall be understood that an information handling system may be differently configured and include different components. As illustrated in FIG. 5, system 500 includes a central processing unit (CPU) 501 that provides computing resources and controls the computer.

CPU 501 may be implemented with a microprocessor or the like, and may also include a graphics processor and/or a floating point coprocessor for mathematical computations. System 500 may also include a system memory 502, which may be in the form of random-access memory (RAM) and read-only memory (ROM).

A number of controllers and peripheral devices may also be provided, as shown in FIG. 5. An input controller 503 represents an interface to various input device(s) 504, such as a keyboard, mouse, or stylus. There may also be a scanner controller 505, which communicates with a scanner 506. System 500 may also include a storage controller 507 for interfacing with one or more storage devices 508 each of which includes a storage medium such as magnetic tape or disk, or an optical medium that might be used to record programs of instructions for operating systems, utilities and applications which may include embodiments of programs that implement various aspects of the present invention. Storage device(s) 508 may also be used to store processed data or data to be processed in accordance with the invention. System 500 may also include a display controller 509 for providing an interface to a display device 511, which may be a cathode ray tube (CRT), a thin film transistor (TFT) display, or other type of display. The computing system 500 may also include a printer controller 512 for communicating with a printer 513. A communications controller 514 may interface with one or more communication devices 515, which enables system 500 to connect to remote devices through any of a variety of networks including the Internet, an Ethernet cloud, an FCoE/DCB cloud, a local area network (LAN), a wide area network (WAN), a storage area network (SAN) or through any suitable electromagnetic carrier signals including infrared signals.

In the illustrated system, all major system components may connect to a bus 516, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A security module to provide a security service to one or more of a plurality of devices that are communicatively coupled to the security module, the security module comprising:
   at least one processor;
   one or more memory devices communicatively coupled to the at least one processor;
   a security policy that is stored in a memory device of the one or more memory devices, the security policy sets forth one or more tests for validating an input from a device with an uncertain reliability status because of a potential error or a potential security breach;
   a command controller comprising at least one processor and coupled to a network interface that receives the input from the device with an uncertain reliability status;
   wherein the security module is further configured to:
      receive the input via the command controller that is coupled to the network interface;
      perform a security analysis of the input according to the security policy, the security analysis comprising using data from one or more datasets of validation data relevant to the input to gauge reliability of the input by determining whether the input from the device comprises an anomaly relative to at least one dataset of the one or more datasets; and
      responsive to the security analysis determining that the input does not comprise an anomaly, output, via a validator, a validation signal to the command controller to authorize further processing of the input by allowing the input to be forwarded to at least one device to enable an action by the at least one device based upon the input, and
      responsive to the security analysis determining that the input comprises an anomaly, reject further processing of the input as a valid input.

2. The security module according to claim 1, wherein the one or more datasets comprises at least one or more of: data obtained from one or more same or similar devices related to a same or similar input; data regarding a trend related to the input; and data regarding a trend related to the device; and a user-definable security criterion.

3. The security module according to claim 2, wherein the input comprises information related to an Internet of Things (IoT) device and the security analysis of the input comprises a comparison between the input and data received from at least one other IoT device as an independent source of data.

4. The security module according to claim 2, wherein the security analysis of the input comprises a comparison between the input and metadata that comprises information from one or more independent sources.

5. The security module according to claim 3, wherein the analysis of the input comprises a comparison between the input and crowd-sourced data that is gathered from the at least one other IoT device, the crowd-sourced data being used to define a norm associated with the input.

6. The security module according to claim 1, wherein the security component is implemented in a gateway.

7. A gateway for providing security verification to a network of devices, the gateway comprising:
   at least one processor;
   one or more memory devices communicatively coupled to the at least one processor;
   a network interface with a network port that receives an input from a device from the network of devices, the device having an uncertain reliability status;
   a command controller comprising at least one processor and communicatively coupled to the network interface to direct the input to a security module that performs a security analysis of the input according to a security policy, the security policy is stored in a memory device of the one or more memory devices and sets forth one or more tests for validating reliability of the input; and
   wherein the gateway is further configured to:
   receive the input via the command controller;
   perform the security analysis comprising using data from one or more datasets of validation data relevant to the input to gauge reliability of the input by determining whether the input from the device comprises an anomaly relative to at least one dataset of the one or more datasets;
   responsive to the security analysis determining that the input does not comprise an anomaly, output via a validator, a validation signal to the command controller to authorize further processing of the input by allowing the input to be forwarded to at least one device to enable an action by the at least one device based upon the input; and
   responsive to the security analysis determining that the input comprises an anomaly, output a validation signal to the command controller to reject further processing of the input as a valid input.

8. The gateway according to claim 7, wherein the security analysis of the input comprises comparing the input to at least one of the one or more datasets comprising one or more of a characteristic pattern, metadata, and crowd-sourced data.

9. The gateway according to claim 7, wherein the command controller receives the input from a third-party gateway device to allow the security analysis of the input before allowing the input to be forwarded to an intended recipient of the input.

10. A method to provide security to a network of devices, the method comprising:
    receiving via a network interface an input from a device having an uncertain reliability status because of a potential error or a potential security breach;
    directing the input to a security zone service that determines a reliability factor associated with the input to validate the input;
    analyzing the input comprising using data from one or more datasets of validation data relevant to the input to gauge the reliability factor of the input by determining whether the input from the device comprises an anomaly relative to at least one dataset of the one or more datasets;
    in response to the security zone service validating the input because the reliability factor is within an acceptable range, sending a confirmation to a command controller to authorize further processing of the input by allowing the input to be forwarded to at least one device to enable an action by the at least one device based upon the input; and
    in response to the security zone service not validating the input because the reliability factor is not acceptable, sending an instruction to the command controller to reject further processing of the input as a valid input.

11. The method according to claim 10, wherein the analysis of the input comprises comparing the input with at least one of the one or more datasets comprising one or more of a characteristic pattern, metadata, and crowd-sourced data to assess the reliability factor associated with the input.

12. The method according to claim 11, wherein the input comprises data representing a first condition and where the step of comparing the input comprises correlating data representing the first condition and related to a first IoT device to detect an anomalous variation in the data in the input that represents the first condition.

13. The method according to claim 12, wherein the first condition is derived from information acquired via machine learning.

14. The method according to claim 12, further comprising determining a relationship between the device and the first IoT device.

15. The security module of claim 1 wherein the security module is further configured to:
    responsive to the security analysis determining that the input comprises an anomaly, assess a risk factor associated with the anomaly; and
    responsive to the risk factor of the anomaly exceeding an acceptable level threshold, cause an alert to be communicate to a user.

16. The gateway according to claim 7, wherein the one or more datasets comprises at least one or more of: data obtained from one or more same or similar devices related to a same or similar input; data regarding a trend related to the input; and data regarding a trend related to the device; and a user-definable security criterion.

17. The method to claim 10 further comprising:
    responsive to the reliability factor exceeding an acceptability threshold, causing an alert to be communicate to a user.

18. The security module of claim 1 wherein the security module is further configured to:
    responsive to the security analysis determining that the input comprises an anomaly, blocking other inputs from the device until the device's reliability status has been cleared.

19. The gateway of claim 7 wherein the gateway is further configured to:
    responsive to the security analysis determining that the input comprises an anomaly, assess a risk factor associated with the anomaly; and
    responsive to the risk factor of the anomaly exceeding an acceptable level threshold, cause an alert to be communicate to a user.

20. The gateway of claim 7 wherein the gateway is further configured to:
    responsive to the security analysis determining that the input comprises an anomaly, blocking other inputs from the device until the device's reliability status has been cleared.

21. The method of claim 10 wherein the gateway is further configured to:
    response to the security zone service not validating the input because the reliability factor is not acceptable, blocking other inputs from the device until the device's reliability status has been cleared.

\* \* \* \* \*